June 17, 1969  G. BRINDA  3,450,149
TUBE-PIERCING VALVE ASSEMBLY
Filed July 12, 1967  Sheet 2 of 2
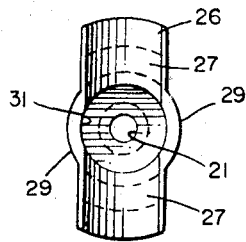
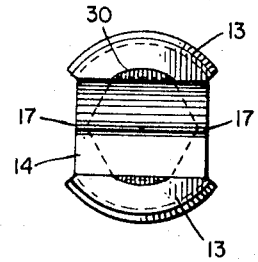
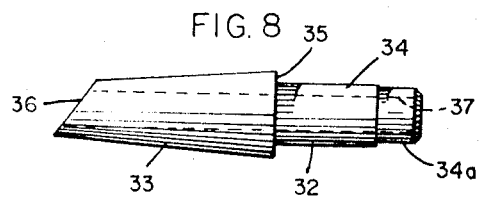
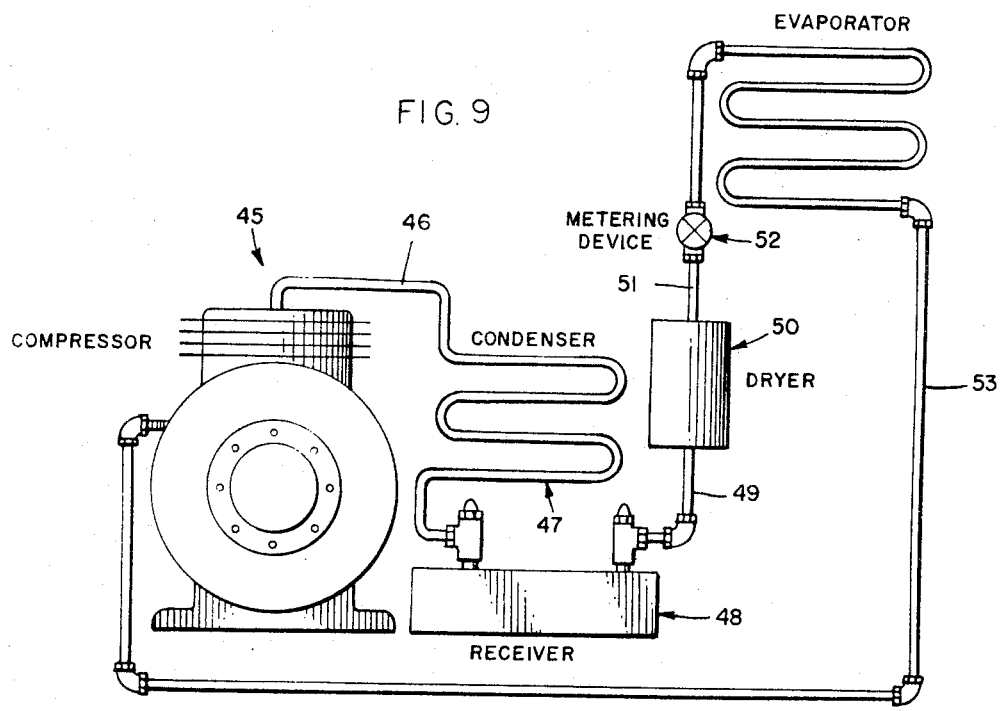
INVENTOR:
GREGORY BRINDA
BY
Dawson, Tilton, Falloy, Lungmus
ATT'YS United States Patent Office 3,450,149
Patented June 17, 1969

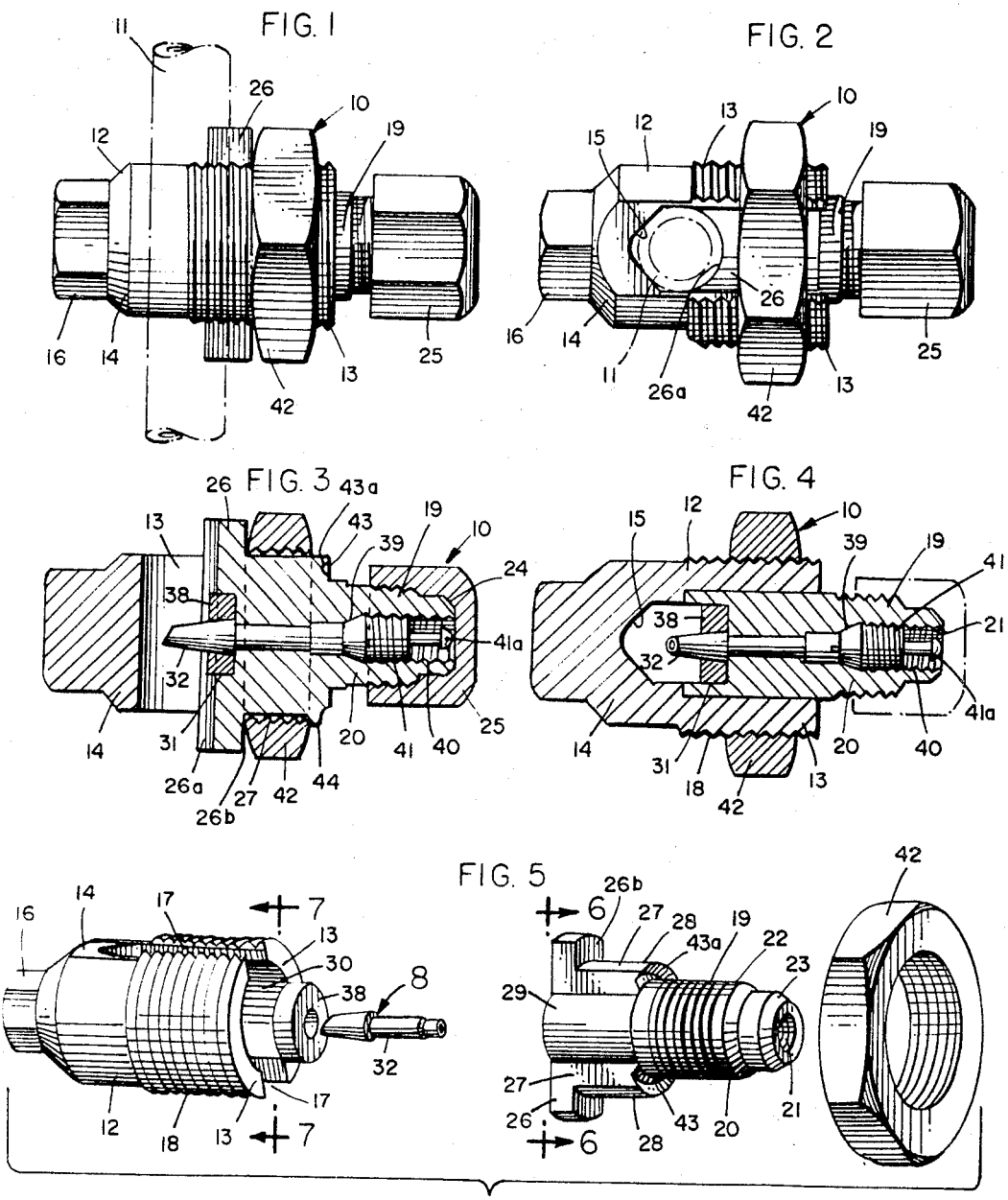

3,450,149
TUBE-PIERCING VALVE ASSEMBLY
Gregory Brinda, 107 Long Ave.,
North Aurora, Ill. 60542
Filed July 12, 1967, Ser. No. 652,746
Int. Cl. F16l 55/18, 41/04; F16k 51/00
U.S. Cl. 137—318                                    9 Claims

ABSTRACT OF THE DISCLOSURE

A tube-piercing valve assembly particularly adapted for use in hermetically sealed systems. The valve assembly includes an elongated tube-centering member having a pair of spaced-apart fingers which receive and center a tube. A valve body is also received between the fingers, and the valve body includes a clamping portion which extends transversely outwardly through the space between the fingers. A tube-piercing needle is carried by the valve body and extends longitudinally toward the tube. A locking nut is threadedly engaged with the fingers, and as the nut is tightened, the clamping portion of the valve body and the needle are urged toward the tube to clamp and pierce the tube.

Background of the invention

This invention relates to a tube-piercing valve assembly which finds particularly utility in hermetically sealed systems such as refrigeration units. These systems are subject to internal malfunctions which cannot be identified and corrected unless the system is somehow opened. Some common problems that arise are leaks in the system resulting in loss of refrigerant, a malfunctioning metering device, an overchanged unit, a restriction in the evaporator, and the like.

Frequently the easiest way to diagnose the particular cause of the malfunction is to obtain a pressure differential between two points of the system, and it is extremely desirable to obtain this pressure differential without cutting into the system. This is particularly so when the system is hermetically sealed, and restoring the system to the hermetic condition may present difficulties. It is also important that the problem be diagnosed and corrected as soon as possible. If a malfunction occurs in refrigeration systems, for example, spoliation and loss of the food being refrigerated can result unless the problem is quickly corrected.

Once the problem has been determined, it must be corrected. For example, if the problem has been disgnosed as a leak in the system, the leak must be plugged and more refrigerant must be added. If the unit is overcharged, refrigerant must be removed. Frequently oil or other matter may find its way into the refrigerant and clog restricted passages and this matter should be removed.

Tube-piercing valves for use with hermetically sealed systems have been provided in the past. However, these systems are ordinarily very compact, and many of the components of the system and the tubing or conduit that connects them are not readily accessible. Frequently, the serviceman cannot see the section of tubing to which the valve must be applied, and he must work entirely by feel. The compact system makes it extremely difficult both to position properly the valve and to manipulate the necessary wrenches to tighten the valve on the tubing. These valves usually include a plurality of parts which must be assembled at the point where the valve is to be placed on the line. During manipulation of these parts, one or the other may be dropped, resulting in loss of valuable time.

Summary of the invention

The inventive valve assembly can be quickly and easily installed at almost any point of the system. Only two parts need be assembled at the point of installation, and these parts are mated so that proper alignment can be readily achieved. The shape and arrangement of the parts enables the valve to be tightened on the tubing even in relatively inaccessible areas of the system in which the serviceman must operate "blind."

Description of the drawing

FIG. 1 is an elevational view of the inventive valve assembly;
FIG. 2 is a top view of the valve assembly of FIG. 1;
FIG. 3 is a sectional view similar to FIG. 1;
FIG. 4 is a sectional view similar to FIG. 2;
FIG. 5 is an exploded perspective view of the valve assembly;
FIG. 6 is a view taken along the line 6—6 of FIG. 5;
FIG. 7 is a view taken along the line 7—7 of FIG. 5;
FIG. 8 is an elevational view of the tube-piercing needle; and
FIG. 9 is a schematic view of a refrigeration system in which the valve assembly may be used.

Description of the preferred embodiment

Referring now to FIGS. 1–5, the numeral 10 designates generally a tube-piercing valve assembly which is secured to a tube 11 shown in phantom. The valve assembly 10 includes an elongated tube-centering member 12 which is seen to be generally Y-shaped and which includes a pair of longitudinally extending spaced-apart fingers 13 joined at one end thereof by a connecting portion 14. As can best be see in FIGS. 2 and 4, the connecting portion 14 is provided with a V-shaped groove 15 which extends transversely between the fingers 13. Extending longitudinally outwardly from the connecting portion 14 away from the fingers 13 is a nut-shaped projection 16 which acts as nut means adapted to be engaged by a wrench. The nut 16 is advantageously provided with a ½ inch hexagonal shape in order to fit the standard valve cap socket on a refrigeration wrench.

Referring to FIGS. 5 and 7, the fingers 13 are generally arcuately shaped and are separated by a pair of longitudinally extending slots 17. The external surface of each of the fingers 13 is provided with a threads 18 along most of the length thereof.

Received between fingers 13 is elongated valve body 19. As can best be seen in FIG. 5, valve body 19 includes a longitudinally extending generally cylindrical central portion 20 provided with a longitudinal bore 21 therethrough. The outer end of the cylindrical central portion 20, i.e., the end extending longitudinally outwardly from the fingers 13, is threaded to provide a standard male connector 22 terminating in a 45° flare 23 adapted to be sealingly engaged by a correspondingly flared surface 24 (FIG. 3) of sealing cap 25.

The inner end of the valve body includes a clamping portion 26 extending transversely outwardly of the central portion 20. Referring to FIGS. 1 and 3, the clamping portion 26 extends through the slots 17 beyond the outer surfaces of fingers 13. The inner end of clamping portion 26 is provided with a curved or U-shaped trough or groove 26a (FIG. 2) which cooperates with the V-shaped groove 15 to center and clamp the tube 11.

Extending radially outwardly from the central portion 20 of the valve body between the clamping portion 26 and the connector 22 are thickened or jacket portions 27 having curved outer surfaces 28 which are generally concentric with the curved outer surface 29 of the central portion 20. The radius of curvature of the outer surface 29 of the cylindrical central portion of the valve body is only slightly less than the radius of curvature of the arcuate inner surfaces 30 of the fingers 13 (FIGS. 5 and 7), and the radius of curvature of the outer surfaces 28 of the thickened portions 27 of the valve body is slightly less than the radius of curvature of the threaded outer surfaces of the fingers.

The inner end of the valve body 19 is provided with a generally cylindrical recess 31 concentric with the bore 21 of the valve body, and tube-piercing needle 32 is received by the inner end of the bore. Referring to FIG. 8, needle 32 is provided with a tapered piercing portion 33 and a shank portion 34. The shank portion 34 terminates in a slightly reduced portion 34a which facilitates insertion of the shank portion into the bore 21 of the valve body. The shank portion 34 is sized to provide a press fit with the bore 21 so that once the needle is inserted therein, it will not be inadvertently removed. The tapered portion 33 provides an annular shoulder 35 which engages the bottom of recess 31 and prevents the needle from being pushed farther into bore 21 when it engages tube 11. The tapered portion 33 of the needle terminates in an inclined face 36, and the needle is provided with a longitudinally extending bore 37 which communicates with the bore 21 of the valve body.

Annular gasket 38 surrounds the tapered portion 33 of the needle and is received by the cylindrical recess 31. The size of the gasket 38 is such that a press fit is maintained with either the cylindrical recess or the needle to prevent inadvertent removal of the gasket, and the gasket extends longitudinally outwardly slightly beyond the bottom of the curved trough 26a.

Referring to FIGS. 3 and 4, the central bore 21 of the valve body flares outwardly as at 39, and the outer end of the bore 21 is provided with internal threads 40. A standard tire valve 41 such as a Schrader valve is threadedly received by the outer end of bore 21 and seats against the flared portion 39 of the bore to provide a fluid-tight seal therewith. The Schrader valve may be opened by depressing the spring-urged valve stem 41a. It is to be understood, however, that other types of valves may be used.

Locking nut 42 is threadedly engaged with the fingers 13 of the tube centering member 12. As described previously, the clamping portion 26 of the valve body extends transversely outwardly through the slots 17 between the fingers so that as the locking nut 42 is threaded onto the fingers, the valve body is urged toward the V-shaped groove 15 of the connecting portion 14. The radius of curvature of the curved outer surface 28 of the thickened portions 27 of the valve body are slightly less than the radius of curvature of the threaded surfaces of the fingers so that the locking nut 42 does not engage the surfaces 28 as it is tightened. The locking nut may be tightened by an ordinary ratchet wrench, crescent wrench, or the like.

Preferably the locking nut is permanently retained on the valve body to reduce the possibility that the locking nut will be dropped by the serviceman. For this purpose, the outer end of each jacket portion 27 is provided with an arcuate groove 43 which can best be seen in FIG. 5 and which is partially defined by an inclined lip 43a. The outer end of the valve body is inserted through the opening of the lock nut and the jacket portion 27 is rotatably received therein. Thereafter, the lip 43a of each jacket portion 27 is pounded outwardly to provide an outwardly extending flange 44 which rotatably retains the locking nut on the jacket portion. In FIG. 3 the upper groove 43 is shown before the groove defining lip 43a has been pounded outwardly while the bottom wall is shown pounded outwardly to provide retaining flange 44.

*Operation*

FIG. 9 illustrates a hermetically sealed refrigeration system on which the valve assembly 10 finds particular utility. It is to be understood, however, that the valve 10 may be used on systems other than hermetically sealed systems and refrigeration systems. The numeral 45 designates an ordinary refrigeration compressor which pumps refrigerant through tube or conduit 46 to condenser 47. The refrigerant continues from the condenser 47 to the receiver 48, which acts as a reservoir and collects and stores excess liquid refrigerant. The refrigerant passes from receiver 48 through tube 49, through dryer 50, and through tube 51. Interposed in tube 51 is metering device 52 which selectively restricts the amount of refrigerant flow. The refrigerant then passes through evaporator 52 and returns to the compressor 45 through tube 53.

When the system is malfunctioning, the serviceman may wish to check any one or more of the various components of the system. For example, the trouble may be caused by a malfunctioning compressor 45, metering device 52, etc.; or the system may be low on refrigerant due to a leak; or the evaporator may be restricted by oil or foreign matter. In order to diagnose the cause of the malfunction the serviceman may take a pressure differential reading between either side of the suspected component or between the high side of the system, i.e., the portion of the system between the compressor 45 and the evaporator 52, and the low side of the system, i.e., the portion of the system between the evaporator and the compressor. Since the system is ordinarily hermetically sealed, the pressure reading device preferably maintains the hermetically sealed condition so that the system need not be resealed.

The valve assembly 10 may be secured to any of the various tubes of the system at the desired location. For example, if the refrigerant charge is to be tested, one valve assembly may be secured to tube 51 on the high side of the system and another valve assembly may be secured to the tube 52 on the low side. The valve assembly 10 is secured to the tube by inserting the tube centering member 12 over the tube so that the fingers 13 straddle the tube. The valve assembly is suitable for use with any sized tubing up to a diameter equal to the width of slots 17 between the fingers 13. The valve readily accommodates tubing smaller than the maximum size by virtue of the V-shaped groove 15 of the connecting portion 14 which centers the tubing within the tube-centering member.

The desired point at which the valve assembly is to be secured may be extremely inaccessible to the serviceman, but the configuration of the valve assembly permits it to be secured even in the most cramped and compact systems. The tube-centering member is placed on the tubing so that the nut 16 of the tube-centering member extends away from the serviceman. The tube centering member may then be secured against rotational movement by engaging the nut 16 by the standard ½ inch hexagonal valve cap socket on a refrigeration wrench. The valve body 19 is the inserted between the fingers 13 of the tube-centering member. The valve body and the tube-centering member are readily aligned even though the serviceman may be operating in a blind manner because the valve body cannot be inserted until the clamping portion 26 is aligned with the slots 17 between the fingers 13. As the valve body proceeds between the fingers 13 into the tube-centering member, the curved outer surfaces 29 of the valve body mate with the curved inner surfaces 30 of the fingers to prevent excessive relative angular movement of the valve body and the tube-centering member with respect to their longitudinal axes. Proper alignment between these two parts is extremely important both because speed is desirable in order to safeguard against spoliation and because a proper sealing engagement between the valve assembly and the tubing might not be achieved if alignment is incorrect.

The nut 42 is rotatably carried by the enlarged portion 27 of the valve body, and after the clamping portion 26 has been inserted between the fingers 13, the nut 42 may be threaded onto the end of the fingers. Since the locking nut 42 is permanently attached to the valve body 19 by the retaining flanges 44 the likelihood that the nut may be dropped by the serviceman while the valve body is being inserted into the tube-piercing member is eliminated.

The threading of locking nut on the fingers may be started by hand, and thereafter the nut may be tightened by a wrench. As the locking nut 42 is rotated, it contacts the outer surface 26b of the clamping portion, which acts as shoulder means, and the clamping portion 26 is urged toward the connecting portion. Tube-piercing needle 32, which is carried by the valve body, contacts the tube 11 shown in phantom in FIGS. 1 and 2 and forces it securely into the V-shaped groove 15, thereby centering the tube between the fingers 13. As the valve body proceeds inwardly under the urging of the locking nut 42, the needle 32 pierces the tube, and the tapered portion 33 of the needle provides an initial seal between the needle and tube to prevent the escape of refrigerant. The locking nut 42 is tightened until the clamping portion 26 contacts the tube 11 and forces it securely into the V-shaped groove 15. As the clamping portion 26 presses against the tube, the gasket 38 is compressed to provide a fluid-tight seal between the needle 32 and the tube and between the needle and the valve body. The curved trough 26a of the clamping portion also accommodates tube sizes less than the maximum size and cooperates with the V-shaped groove to securely position and center the valve assembly on the tube in a fluid-tight manner. It is to be understood, however, that the configurations of the grooves 15 and 26a may be reversed, i.e., the groove 15 may be curved and the groove 26a may be V-shaped, or both may be V-shaped.

The valve assembly 10 is quickly and easily secured to the tubing because only two parts need be secured about the tubing. The locking nut 42 is carried by the valve body 19 and these two components may be treated as a single part by the serviceman. The valve may be tightened even in the most inaccessible locations. The tube-centering member is positioned about the tube so that the nut 16 projects away from the serviceman. The serviceman then inserts his standard ½ inch hexagonal valve cap socket wrench over the nut 16 to hold the tube-centering member secure while the lock nut 42 is tightened thereon. The valve body 19 and the lock nut 42 extend toward the serviceman and the lock nut 42 may easily be tightened by a wrench. Thus, the wrench that is rotated to tighten the valve assembly is closer to the serviceman and more readily rotated while the wrench that engages the more inaccessible end of the valve assembly, i.e., nut 16, need merely be held stationary.

Since the Schrader valve 41 prevents escape of the refrigerant after the needle 32 pierces the tube, the valve body 19 is inserted into the tube-piercing member without the sealing cap 25. After the valve assembly is secured on the tube, a suitable gauge can be secured to the valve body by means of the standard male connector 22 to obtain a pressure reading of the system at the point of location of the valve assembly. The connector 22 extends toward the serviceman, and the gauge is thus readily secured thereto. The gauge would be provided with a suitable valve stem depressor to depress the valve stem 41a and open the Schrader valve 41. By comparing this pressure reading with the pressure reading at another location, a pressure differential can be obtained from which the serviceman may diagnose the cause of the malfunction. If the system is low on refrigerant, a charging line may be attached directly to the male connector 22 through which refrigerant may be added. Refrigerant may also be removed from the system through the valve assembly by depressing the valve stem 41a. If the evaporator has been found to be restricted with oil which has escaped from the compressor, the oil can be purged from the evaporator by attaching a valve assembly to the low side of the evaporator.

After the valve has served its function as a trouble shooter or a problem corrector, the sealing cap 25 may be threadedly engaged with the male connector 22 of the valve body, and the valve assembly may remain attached to the tubing of the system for the life of the system, thereby eliminating the necessity of resealing the system once the cause of the malfunction has been located and corrected.

Both the valve body 19 and the tube-centering member 12 may advantageously be formed integrally from forged brass. After the forging operation, the parts may be trimmed and machined. The needle 32 may be drilled tool steel rod which is machined to the desired dimensions, and the gasket 38 may be formed of any of a number of relatively resilient sealing materials which are resistant to attack by the refrigerant.

While in the foregoing specification a detailed description of a specific embodiment of my invention was set forth for the purpose of illustration, it is to be understood that many of the details herein given may be varied considerably by those skilled in the art without departing from the spirit and scope of my invention.

I claim:
1. A tube-piercing valve assembly comprising:
an elongated integral tube-centering member,
　(i) said tube-centering member having a pair of spaced-apart longitudinally extending fingers, the outer surface of said fingers being curved,
　(ii) said fingers being joined at one end thereof by a connecting portion,
　(iii) said connecting portion being provided with a generally V-shaped transversely extending groove between said fingers,
　(iv) said tube-centering member including nut means extending longitudinally outwardly from said connecting portion away from said fingers,
an elongated valve body received between said fingers, said valve body being provided with a longitudinally extending bore therethrough and terminating at one end thereof in a transversely extending clamping portion,
tube-piercing means carried by said valve body and extending longitudinally from said clamping portion,
gasket means carried by said clamping portion surrounding said tube-piercing means,
a locking nut threadedly engaged with said fingers, and
shoulder means on said valve body extending transversely outwardly of said valve body between said fingers for engagement with said nut, whereby said valve body may be urged toward said connecting portion by rotating said locking nut.

2. The valve assembly of claim 1 in which said clamping portion is provided with a transversely extending curved groove and said clamping portion extends transversely outwardly between said fingers to provide said shoulder means.

3. The valve assembly of claim 2 in which said clamping portion is provided with a generally cylindrical recess concentric with said bore, said gasket means being received by said recess.

4. The valve assembly of claim 3 in which said tube-piercing means is provided by an elongated needle received by said bore, said needle being provided with a bore communicating with said valve body bore.

5. The valve assembly of claim 2 in which said valve body includes a flange spaced from said shoulder means, said locking nut being rotatably received on said valve body and being retained between said shoulder means and said flange.

6. A tube-piercing assembly comprising:
an elongated integral tube-centering member,
　(i) said tube-centering member having a pair of spaced-apart longitudinally extending fingers, said fingers being generally arcuately shaped in transverse cross section, the outer surface of said fingers being threaded,
　(ii) said fingers being joined at one end thereof by a connecting portion, (iii) said connecting portion being provided with a generally V-shaped transversely extending groove between said fingers, (iv) said tube-centering member including nut-shaped projection extending outwardly from said connecting portion away from said fingers, an elongated valve body received between said fingers, (i) said valve body being provided with a longitudinally extending bore therethrough and having a generally cylindrical central portion providing a pair of opposed curved surfaces having a radius of curvature slightly less than the radius of curvature of the inner surfaces of said fingers, (ii) the end of said valve body adjacent said connecting portion including a clamping portion extending transversely outwardly between said fingers beyond the outer surfaces of said fingers, (iii) said clamping portion being provided with a transversely extending groove and a generally cylindrical recess concentric with said bore, (iv) the other end of said valve body terminating in a generally cylindrical threaded portion, an annular gasket received by said clamping portion recess, a tube-piercing needle received by said bore and extending longitudinally outwardly from said clamping portion through said annular gasket, a locking nut threadedly engaged with said fingers, whereby said valve body can be urged toward said connecting portion by tightening said locking nut.

7. The valve assembly of claim 6 in which said valve body includes a flange longitudinally spaced from said clamping portion, said locking nut being rotatably received on said valve body and being retained between said clamping portion and said flange.

8. The valve assembly of claim 6 in which said valve body includes a radially outwardly extending thickened portion about said cylindrical central portion between said clamping portion and said threaded portion, said thickened portions providing a pair of opposed curved surfaces having a radius of curvature slightly less than the radius of curvature of the outer surfaces of said fingers.

9. The valve assembly of claim 8 in which said valve body includes a flange extending outwardly from at least one of said thickened portions, said locking nut being rotatably received on said thickened portions and being retained between said clamping portion and said flange.

References Cited

UNITED STATES PATENTS

| | | | |
|---|---|---|---|
| 2,875,777 | 3/1959 | Lacart | 137—318 |
| 3,030,828 | 4/1962 | Callen | 137—318 X |
| 3,115,889 | 12/1963 | Franck et al. | 137—318 |
| 3,162,211 | 12/1964 | Barusch | 137—318 |
| 3,198,206 | 8/1965 | O'Brien | 137—318 X |

WILLIAM F. O'DEA, *Primary Examiner.*

D. R. MATTHEWS, *Assistant Examiner.*

U.S. Cl. X.R.

251—146

PO-1050
(5/69)

UNITED STATES PATENT OFFICE
CERTIFICATE OF CORRECTION

Patent No. 3,450,149            Dated June 17, 1969

Inventor(s) Gregory Brinda

It is certified that error appears in the above-identified patent and that said Letters Patent are hereby corrected as shown below:

In column 6, line 67, insert --valve-- before "assembly".

SIGNED AND SEALED
FEB 24 1970

(SEAL)
Attest:

Edward M. Fletcher, Jr.
Attesting Officer

WILLIAM E. SCHUYLER, JR.
Commissioner of Patents